(No Model.)

H. P. LANDER.
RAKE.

No. 334,444. Patented Jan. 19, 1886.

Witnesses.
E. Planta.
S. F. Rugg.

Inventor.
Harris P. Lander,
Per C. A. Shaw,
Attorney.

N. PETERS, Photo-Lithographer, Washington, D. C.

UNITED STATES PATENT OFFICE.

HARRIS P. LANDER, OF KINGFIELD, MAINE.

RAKE.

SPECIFICATION forming part of Letters Patent No. 334,444, dated January 19, 1886.

Application filed September 4, 1885. Serial No. 176,168. (No model.)

*To all whom it may concern:*

Be it known that I, HARRIS P. LANDER, of Kingfield, in the county of Franklin, State of Maine, have invented a certain new and useful Improvement in Rakes, of which the following is a description sufficiently full, clear, and exact to enable any person skilled in the art or science to which said invention appertains to make and use the same, reference being had to the accompanying drawings, forming part of this specification, in which—

Figure 1:
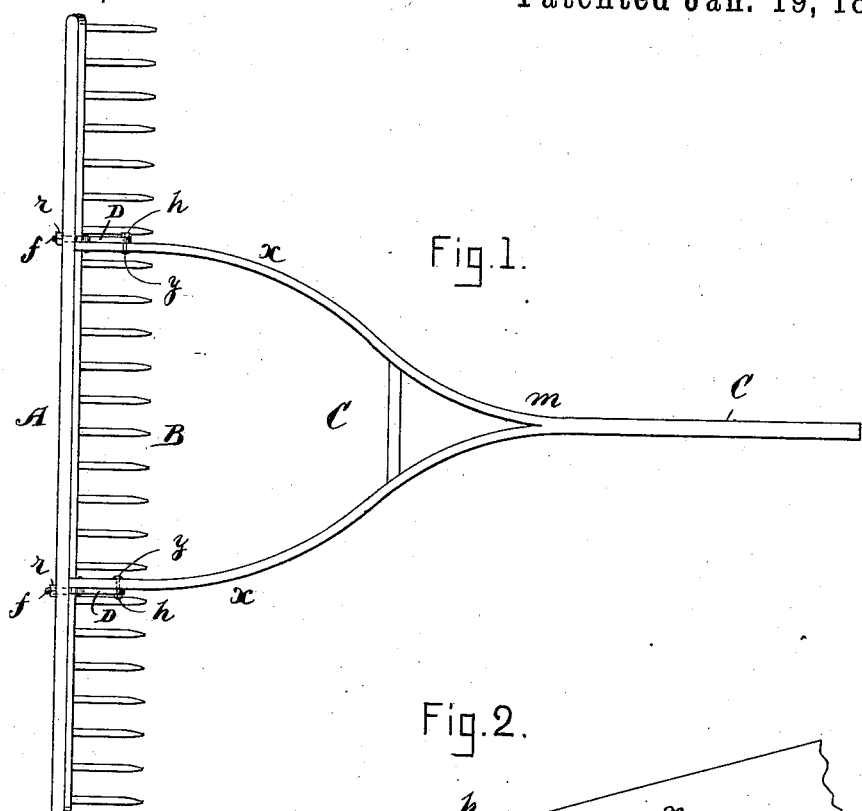
Figure 2:
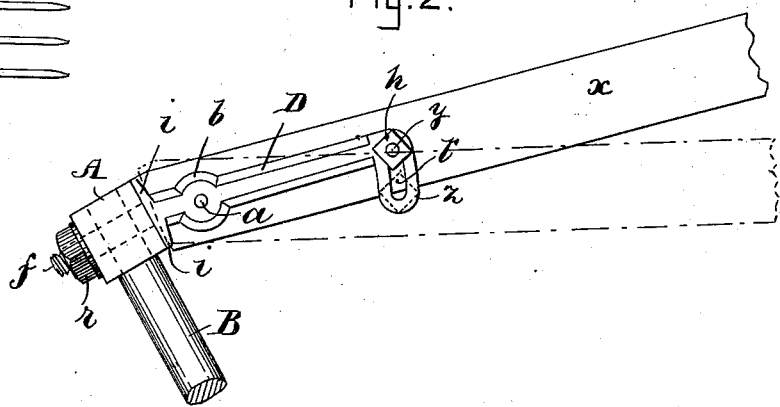

Figure 1 is a top plan view of my improved rake; Fig. 2, a diagram showing the method of attaching the handle to the head, and Fig. 3 a top plan view of the parts shown in Fig. 2.

Like letters of reference indicate corresponding parts in the different figures of the drawings.

My invention relates to that class of drag-rakes which are provided with hinged or adjustable heads, being designed as an improvement on the rake shown and described in United States Letters Patent No. 88,325, granted to H. F. Morton, March 30, 1869; and it consists in a novel rake-head provided with teeth, a bracket removably secured thereto, a handle pivoted to said bracket near the head, a slotted arm at the upper end of said bracket projecting laterally from one side thereof, and a bolt passing through said handle for engaging said slot, all as hereinafter more fully set forth and claimed, by which a simpler, cheaper, and more effective article of this character is produced than is now in ordinary use.

Figure 3:
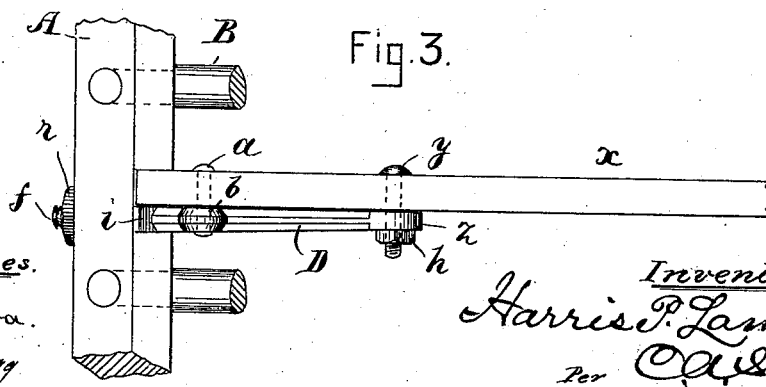

The nature of the improvement will be readily understood by all conversant with such matters from the following explanation:

In the drawings, A represents the head, B the teeth, and C the handle, these parts being constructed of ash, walnut, or other suitable hard woods. The head proper is six feet in length, one and one-quarter inch high, and one inch wide. The teeth are twenty-four in number, fifteen inches in length, oval in cross-section, and properly chamfered or beveled at their lower ends to enable the rake to be dragged without catching in the stubble or other obstructions. The handle is six feet in length and bifurcated, being formed in two sections, $x\ x$, which are united at $m$ to form the handle proper, C, the sections $x$ being each one and one-quarter inch high and one-half an inch wide, and the handle proper rounded from the junction of the sections at $m$ to the outer end. Projecting forward from the head A, and preferably inclined downwardly at an obtuse angle thereto, there are two iron or metallic brackets, D, which are respectively secured to the head by means of the screw-threaded studs $f$ and nuts $r$, the studs passing transversely through the head, and the nuts being turned down onto the studs, as best seen in Figs. 2 and 3. Each bracket is provided at its upper and lower side with a flange, $i$, said flanges forming a rabbet or shoulder, which rests against the forward side of the head when the bracket is attached thereto, as shown. Projecting downwardly from the forward end of either bracket there is an arm, $z$, provided with an elongated slot, $t$. The bodies of the brackets are enlarged at $b$, and the handle C is jointed to the head of the rake through the medium of said brackets by bolts $a$, which respectively pass through the sections $x$ and enlarged portions $b$ of the brackets D. Each of said sections is also provided with a bolt, $y$, and nut $h$, the bolts passing through the sections $x$, and being adapted to work in the slots $t$ of the arms $z$.

In the use of my improvement it will be obvious that the head A and the inclination of the teeth therein may be adjusted to a certain extent with respect to the handle C by means of the bolt $y$, nut $h$, and slotted arm $z$, the handle, as it is raised and lowered for adjustment, passing through the arc of a circle of which the joint-bolt $a$ is the center. When it is desired to further incline the teeth, the nut $r$ is loosened on the screw $f$, the bolts $a$ and $y$ withdrawn, and the entire bracket D turned over on the screw $f$, thus giving the handle and head twice as much relative adjustment as is possible in the device of Morton referred to, and with the same length of adjusting-slot in the arm $z$ of the bracket D. It will also be obvious that the brackets D not only afford a simple and effective means of adjusting the handle of the rake with respect to its head, and vice versa, but serve to strengthen the implement and render it more durable.

I am aware that the handle in a drag-rake has heretofore been adjustably connected with its head, and do not therefore claim the same, broadly; but, Having thus explained my invention, what I claim is—

1. The improved rake herein described, the same consisting of a handle and a head provided with teeth, in combination with a reversible bracket detachably secured at one end to said head and provided at the other end with a slotted lateral arm projecting from one side thereof, a bolt passing through said handle and engaging said slot, and a bolt passing through said handle and bracket intermediately of the ends of the latter, by which the parts are pivotally connected, substantially as described.

2. The improved rake herein described, the same consisting of a handle and a head provided with teeth, in combination with a reversible bracket provided at one end with a slotted lateral arm projecting from one side thereof, a bolt passing through said handle and engaging said slot, said bracket being provided at the other end with a screw-threaded stud adapted to pass through said head, and with flat-faced shoulders at the inner end of said stud, against which said head is adapted to rest, a nut on said stud for clamping said head in place, and a bolt passing through said handle and bracket intermediately of said radial arm and stud, by which the parts are pivotally connected, substantially as described.

HARRIS P. LANDER.

Witnesses:
 ALONZO KNAPP,
 M. B. POTTLE.